Oct. 16, 1928.
G. E. HAZARD
1,688,185
VALVE
Filed May 21, 1927
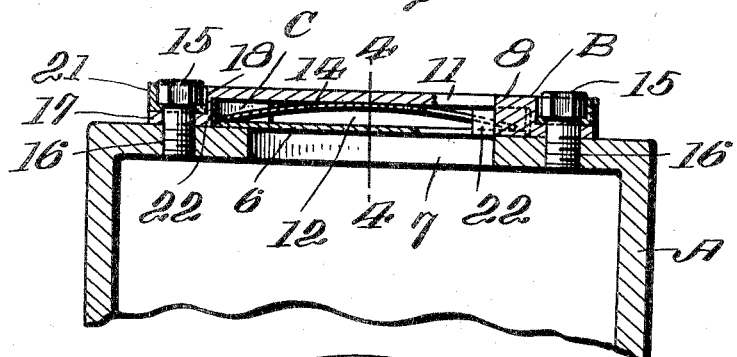
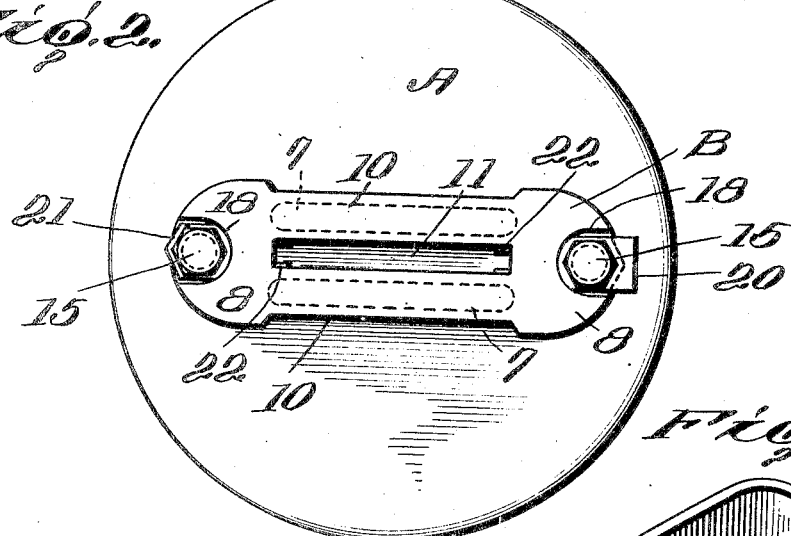
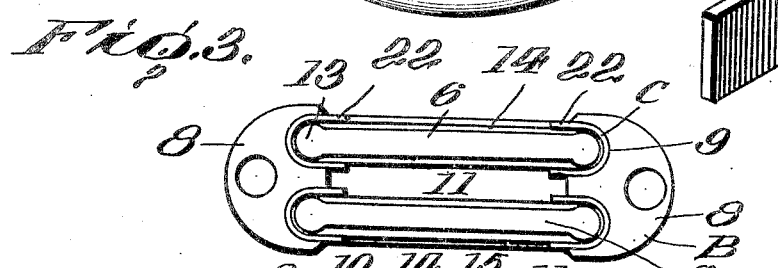
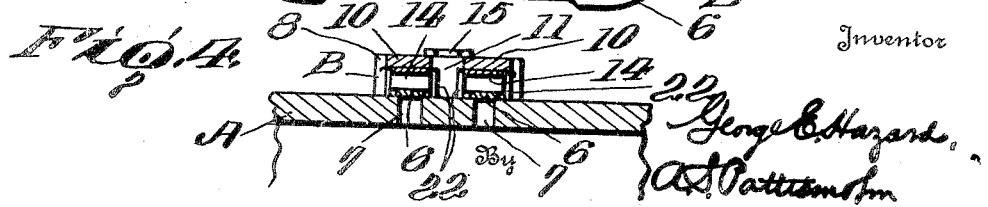
Inventor
George E. Hazard
By A. S. Patterson
Attorney Patented Oct. 16, 1928.

1,688,185

UNITED STATES PATENT OFFICE.

GEORGE EDGAR HAZARD, OF ROCHESTER, NEW YORK, ASSIGNOR TO KELLOGG MANUFACTURING COMPANY, OF ROCHESTER, NEW YORK.

VALVE.

Application filed May 21, 1927. Serial No. 193,162.

This invention relates to improvements in valves being directed more particularly and specifically to a cage for a type of valve commonly referred to as a plate valve, whereein a flexible plate reciprocates in and is guided by the cage.

The primary object of the invention is the provision of an improved cage for valves.

A further object of the invention is the provision of a novel form of end wear plate for valve cages.

Another and further object of the invention is the provision of an improved form of cage for valves which is extremely cheap and simple of manufacture and higly efficient in operation.

Other objects, novel features of construction and improved results of the invention will be more specifically pointed out in the accompanying drawings and the following description.

In the drawings:

Figure 1 is a longitudinal vertical sectional view through a cylinder head having the improved valve cage applied thereto.

Figure 2 is a top plan view of the improved cage applied to a cylinder head.

Figure 3 is a bottom plan view of the cage.

Figure 4 is a vertical transverse sectional view taken on the line 4—4 of Figure 1.

Figure 5 is a detail perspective view of one of the wear plates.

Describing the invention in detail, reference being had to the accompanying drawings in which like parts are designated by similar reference numerals throughout the description, A represents the cylinder head of a compressor or like mechanism, while B indicates the valve cage as an entirety.

In the form of the invention illustrated in the drawings, a pair of valves are shown, the valves themselves being flexible plate-like members designated by the numeral 6. These valve plate members are positioned above and close the longitudinal slots 7 in the cylinder head, the plates being slightly wider than the slots, as clearly appears in Figure 4 of the drawings.

The valve plates 6 are held in position by the cage B which cage has enlarged ends 8 in which are the semi-circular grooves or guides 9. The valve cage is made as an integral unit, the two ends 8 being joined together by the two flat bar-like portions 10 which are spaced apart by a longitudinal slot or opening 11. The end portions of the cage are much thicker than the bars 10 and when the cage is positioned upon the upper end of the cylinder head there is consequently provided a chamber 12 between the cylinder head and the bars.

The valve plates 6 are preferably made of spring steel and have their ends enlarged as at 13. These enlarged ends of the valve plates are positioned within the semi-circular grooves or guides 9 of the valve cage. Bow springs 14 which are likewise preferably made of spring steel, are positioned above the plates so that they are between the valves and the bars 10 of the cage. These bow springs tend normally to hold the valves against the cylinder head to close the port openings 7.

Bolts 15 positioned at the ends of the cage engage suitable threaded openings 16 in the cylinder head to hold the valve cage in position. To insure the proper operation of the valves, it is necessary that the bolts 16 hold the cage securely in position for the reason that should these bolts become loosened, the alinement of the parts would not be maintained, which would immediately allow the thin valve plates to get out of place and stop the proper performance of the valves and of the compressor on which they are mounted.

To insure that once the valve cage is positioned it will be securely held in place, the bolts 16 are provided with locking means. These locking means comprise a lock washer of novel construction which is composed of a thin piece of metal, one end of which is provided with an opening through which the bolt passes. This end of the washer is designated by the numeral 18 and is positioned beneath the squared heads of the bolts 15. The opposite end of the washer extends outwardly as appears at 20 in Figure 2 of the drawings. This outwardly extending end 20 is then bent upwardly and inwardly, and made to assume an angular configuration as clearly appears at 21 in Figure 2 of the drawings. It will be seen in this figure of the drawings that the washer assumes the configuration of two sides of the bolt head and securely locks the bolt against rotation.

When the valves are in operation, it has been found that the valve plates 6 do not deflect but are carried vertically in a flat condition upwardly against the tension of the bow springs 14 which springs are consequently flattened out at each stroke of the piston in the cylinder. These bow springs merely accelerate the rapidity of the valve action. By reason of the fact that the valve plates move upwardly throughout their length, it has been found that a very great wear takes place in the valve cage guide slots 9 and that this wear is throughout the distance of travel of the ends of the valve plates. The wearing of the valve cage is very detrimental to the operation of the valves and calls for repeated replacement of valves cages.

To overcome the wear in the valve cages, I have conceived the valve cage liners or wear plates which are designated by the numeral C. These wear plates or liners are made of hardened spring steel bent into an approximate U-shape as clearly appears in Figure 5 of the drawings. The liners are made of a width equal to or slightly greater than the depth of the cage guides 9 and are of a length sufficient to extend beyond the guides as clearly indicated at 22 in Figures 2 and 3 of the drawings. These liners are pressed into the cage guides and once they are positioned, remain securely in place and protect the cage guides from wear, as they are composed of a material of a hardness equal to that of the material from which the valves plates are made.

Having thus described my invention, what I desire to claim and secure by Letters Patent is:

1. In combination with a plate valve adapted for reciprocation, a cage therefor having guide grooves in its ends adapted to receive the ends of said valves, and liners shaped to fit said grooves and pressed into the same to protect the grooves from wear.

2. In combination with a cylinder head having port openings therein, plate valves for closing said openings, a cage mounted upon said head for holding the valves in place and guiding them during their opening movements, guide grooves in the ends of said cage, and liners for said grooves pressed into the grooves to protect the same from wear.

3. In combination with a cylinder head having port openings therein, plate valves to close said openings, a cage for said valves for holding them in position and guiding them during their opening movements, said cage having semi-circular shaped guide grooves in its ends, the valve plates having enlarged ends extending into said grooves, and liners for said grooves composed of a hardened spring material pressed into said grooves against spring tension, whereby said liners remain in place and protect the grooves from wear.

4. In combination with a plate valve adapted for reciprocation, a cage therefor having guide grooves in its ends adapted to receive the ends of said valves, and liners of spring material shaped to fit said grooves and pressed into said grooves against spring tension whereby said liners remain in place and protect the grooves from wear.

In testimony whereof I hereunto affix my signature.

GEORGE EDGAR HAZARD.